United States Patent [19]

McCan et al.

[11] Patent Number: 4,517,924

[45] Date of Patent: May 21, 1985

[54] ANIMAL HEADGATE

[75] Inventors: Duane A. McCan; Carl L. Smith, Jr., both of Lexington, Nebr.

[73] Assignee: Valley Sales Co., Lexington, Nebr.

[21] Appl. No.: 615,657

[22] Filed: May 31, 1984

[51] Int. Cl.³ .............................................. A01K 1/062
[52] U.S. Cl. .................................. 119/98; 119/147 R
[58] Field of Search ..................... 119/98, 99, 103, 147

[56] References Cited

U.S. PATENT DOCUMENTS

| | | | |
|---|---|---|---|
| 2,113,741 | 4/1938 | Peterson | 119/99 |
| 3,051,127 | 8/1962 | Norbury | 119/99 |
| 3,691,998 | 9/1972 | Luirstra | 119/98 |
| 3,814,060 | 6/1974 | Swenson | 119/98 |

*Primary Examiner*—Hugh R. Chamblee

*Attorney, Agent, or Firm*—Henderson & Sturm

[57] ABSTRACT

An animal headgate having a forward portion and a rearward portion on a stationary frame (11), having a pair of gate pivot members (19) pivotably connected to said frame (11), and a pair of headgates (13) attached to said gate pivot members (19), said headgates (13) being operably movable among receive, latch and release positions. The headgate further includes a pair of first animal securement means (14) attached to said headgates for substantially restraining movement of an animal, and a pair of second animal securement means (15) positioned forward of said first animal securement means (14) to further restrain movement of said animal, said second animal securement means (15) being movably attached to the headgates and operably movable among receive, latch and release positions.

8 Claims, 7 Drawing Figures

ANIMAL HEADGATE

TECHNICAL FIELD

This invention relates generally to headgates as used in animal husbandry.

BACKGROUND ART

Animal husbandry involves the control and management of animals, particularly domestic animals. It is sometimes necessary to physically restrain an animal while it is being attended to. One may wish to control an animal for a variety of purposes such as inspection of the animal, tagging or tattooing the animal for identification, veterinarian aid such as hypodermic injections, and cleaning the animal.

Some animals are small in stature and may be adequately controlled simply by being physically held by an attendant. Larger animals, however, such as cattle must be controlled by other means. It is particularly important that the animal be restrained in such a manner as to effectively accomplish the task for which he is being controlled.

To accomplish such a task, there exists a variety of animal headgates that control an animal's movement by restraining the animal's head region. Headgates generally have three operating positions. The receiving position provides an open headgate, positioned to allow the animal to enter the apparatus. Once in the headgate, the gates are closed around the animal's head region in a latch position to restrain the animal within the headgate. The release position is similar to the receiving position in that the gates are in an open position; the animal is free to exit the apparatus when the headgates are in the release position.

Prior art headgates do not always satisfactorily restrain an animal for all purposes. The major problem with such a headgate is that it allows the animal too much freedom of movement. This is because the animal is restrained by a single securement unit such as a set of bars enclosed near the animals head, one on each side. As there is only a single securement unit, the animal is often able to move about freely, particularly in the head/neck region, which is forward of the securement unit. With such freedom of movement, the purpose of the headgate is often defeated.

Allowing the animal too much movement while the headgate is in the latch mode may result in unwanted consequences. The animal may be able to avoid the intended attention, thereby thwarting the purpose of the apparatus. For instance, a major problem occurs when the animal is placed within the headgate for the purpose of tagging an ear for identification. Headgates such as those already known allow the animal free movement in the head region in front of the headgate. This movement, which may be quite wild and sporatic, makes it difficult for the tender to properly tag the animal's ear. In addition, an animal may injure itself if it becomes irritated and is not properly restrained. Inadequate restraint may even result in injury to those near an animal whose movement becomes wild and uncontrollable.

There is clearly a need for an animal headgate that adequately and safely restrains an animal's movement. In particular, such a headgate should provide restraint capabilities in the crucial shoulder area and forward, including the neck and head. There is a need for a headgate that has a second securement unit positioned forward of the first securement unit to ensure maximum restraint of the animal's movement, particularly in the head/neck region.

The headgate should be operable in a receive, latch and release position, wherein the latch position operates to properly restrain the animal. The headgate should be durable as it must withstand the presence of large animals. It should also be relatively inexpensive to make and use a minimal amount of material.

DISCLOSURE OF THE INVENTION

The above problems are substantially resolved, without undue compromise of other desirable attributes that are already provided by prior art devices, by the provision of the invention disclosed herein. The invention generally provides an animal headgate having a forward portion and a rearward portion on a stationary frame. An animal such as a domestic cow enters the apparatus from the rearward direction. Within the apparatus the cow is restrained by a pair of headgates each having a first and second securement means. While being restrained within the apparatus the animal may be effectively attended to for a variety of reasons including tagging and veterinarian aid. The apparatus includes a locking unit for selectively locking the headgates during the latch position, thereby preventing the animal from exiting the apparatus. When the desired task is completed, the locking unit is disengaged and the animal is allowed to exit the apparatus through the forward portion.

The invention includes generally a stationary frame having a pair of headgates. Each headgate is operably connected to the frame by a headgate pivot member. Each headgate has a first animal securement means attached to the side of the headgate distal from the gate pivot member. Each headgate further includes a second animal securement means operably affixed to either headgate for further restraining movement of an animal. The second animal securement means are positioned forward of the first animal securement means thereby creating a restrained area between the first and second animal securement means substantially forward of the animal's shoulders and rearward of the middle of the animal's head. This crucial area is in many instances the focus of the attention to be given to the animal. Therefore, it is crucial that this area be restrained as effectively as possible. The positioning of a second animal securement means forward of the first animal securement means provides for this needed maximum capability of restraint.

The invention further includes a pivot control unit operably connected between the second animal securement means and the frame for selectively controlling the rotatable position of the second animal securement means. The pivot control unit comprises a set of pivotable angle arms that connect to to the frame at a frame mounted base and to the second animal securement means at a second animal securement means pivot member affixed thereto. The angle arms operably pivot thereby rotating the second animal securement means as the headgates move from the receive, latch and release positions.

In the receive position the headgates are pivoted rearwardly with respect to the frame and the second animal securement means are positioned to allow the animal to move its head and neck region forward of the headgates and the first animal securement means. Once in this position the headgates are pivoted at the gate pivot members to move the gates forwardly until the second animal securement means rotate by means of the pivot control unit to enclose themselves around the animal's neck area. In the latch position, the first animal securement means are positioned just forward of the animal's shoulders and restrain the animal at that point; the second animal securement means are enclosed around the animal's head substantially rearward of the animal's ears and supplement the restraining capabilities of the apparatus.

The apparatus includes a lock unit for selectively locking the headgates while the animal is being attended to. The lock unit comprises a lever-spring type locking mechanism which is commonly known in the prior art. The lock unit is engaged while the headgates are in the latch position. The animal is unable to exit the apparatus while the headgates are in the latch position. When the desired task is completed, the lock unit is disengaged and the headgates are free to open.

In the release position the headgates are rotated forward and the second animal securement means is rotated outward with respect to the headgates thereby allowing the animal to exit the apparatus.

BRIEF DESCRIPTION OF THE DRAWINGS

These and other attributes of the invention will become more clear upon a thorough study and review of the following detailed description of the best mode for carrying out the invention, particularly when reviewed in conjunction with the drawings, wherein.

BEST MODE FOR CARRYING OUT THE INVENTION

Figure 1:
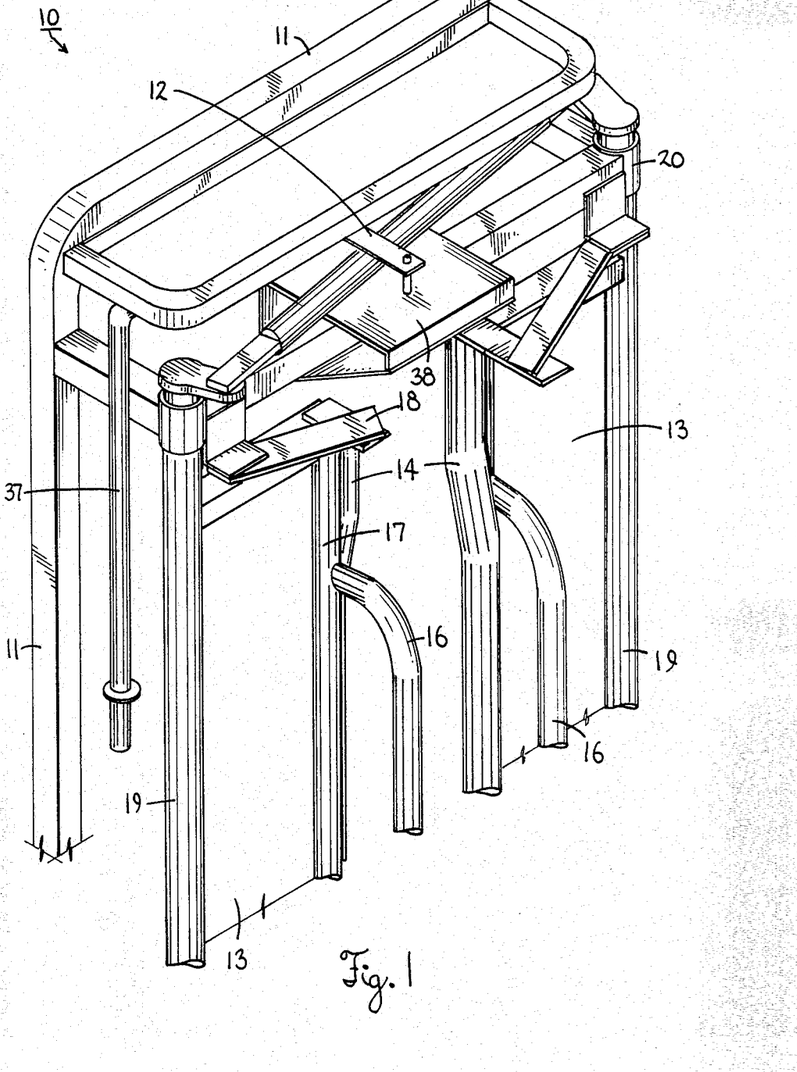
FIG. 1 comprises of a perspective detail view of the animal headgate including the locking unit.
Figure 6:
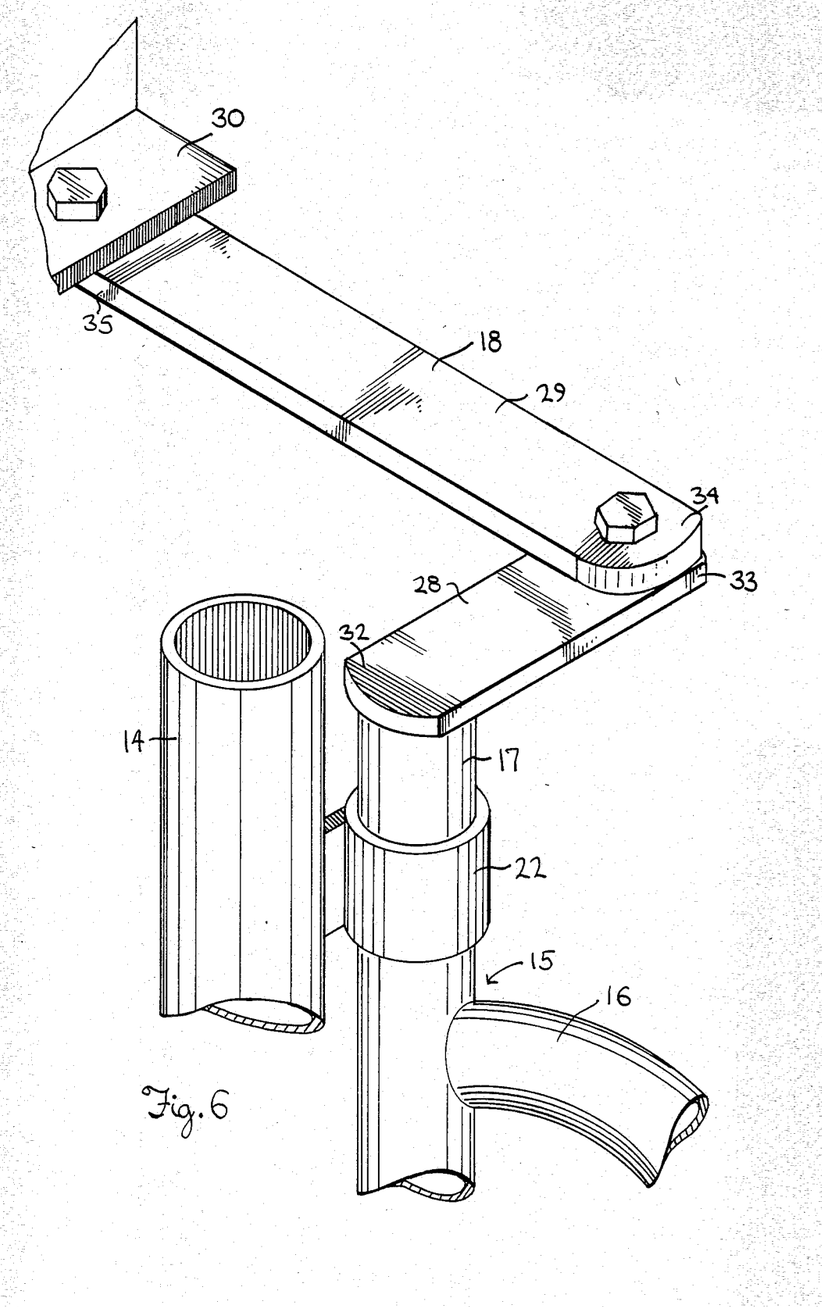
FIG. 6 is an enlarged perspective detail view of the pivot control unit.

Referring now to the drawings and in particular to FIG. 1, the apparatus may be seen as depicted generally by the numeral 10. The apparatus (10) includes generally a stationary frame (11) including a locking unit (12) a pair of headgates (13) including a pair of first animal securement means comprising shoulder bars (14), a pair of second animal securement means (15) comprising a neckbar (16) and a neckbar pivot member (17), and a pair of pivot control units (18) (as best seen in FIG. 6).

The two headgates (13) are substantially mirror images of one another and include the same elements and function similarly. Therefore, only one of the headgates (13) will be described below in a more detailed fashion.

Figure 3:
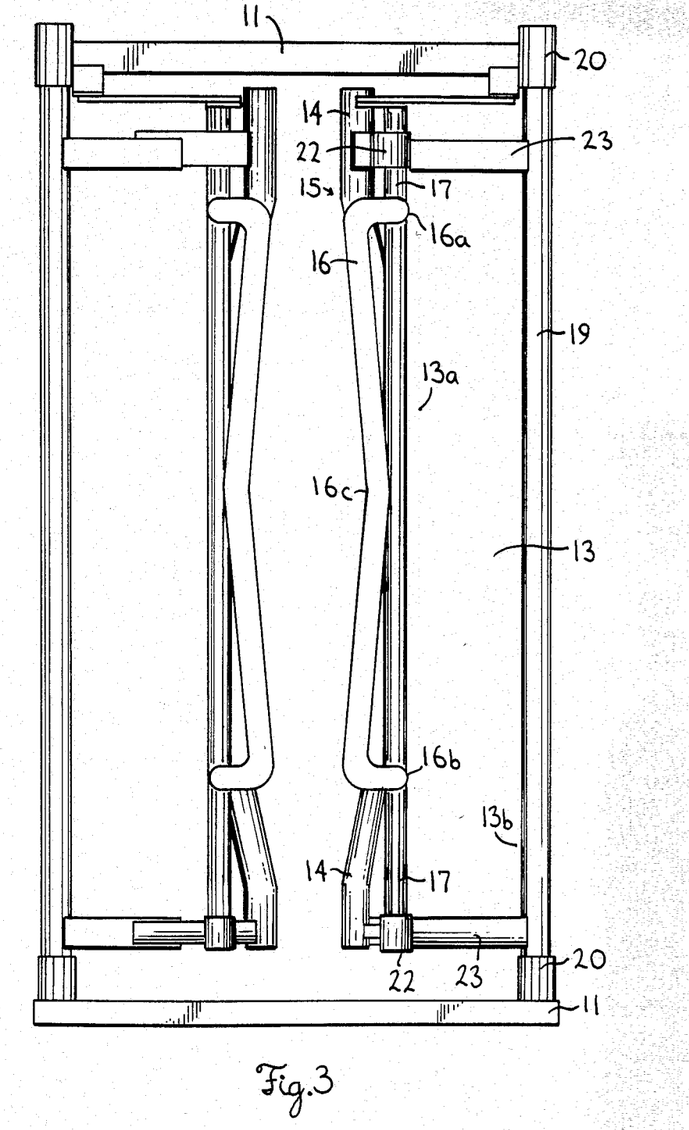
FIG. 3 comprises of a front elevational view of the animal headgate in the latch position.

Referring now to FIG. 3, the headgate (13) includes a first lateral side (13a) and a second lateral side (13b). The headgate (13) is operably affixed to the frame (11) by a gate pivot member (19). The gate pivot member (19) is affixed to the headgate (13) along the second lateral side (13b). The gate pivot member (19) extends vertically from the top of the frame (11) to the bottom of the frame (11). The gate pivot member (19) is operably affixed to the frame (11) at the frame pivot unit (20) located at the top and bottom of frame (11). The gate pivot member (19) is disposed within the hollow cylinder of the frame pivot member (20) so as to allow the gate pivot member (19) to rotate within the frame pivot member (20). Consequently, as the gate pivot member (19) rotates the affixed headgate (13) rotates correspondingly, thereby enabling the headgate (13) to move among receive, latch and release positions.

The first animal securement means which comprises a shoulder bar (14) is affixed to the headgate (13) along the first lateral side (13a). The shoulder bar (14) comprises a metal cylinder of a sufficient width to restrain a cow at the shoulders. The shoulder bar (14) extends substantially parallel to the first lateral side (13a) of the headgate (13) and curves outward from the central vertical axis near the center so as to enclose around the animal just forward of the shoulder area (25) (FIG. 5) in the latch position.

The shoulder bar (14) is affixed to the headgate (13) at a headgate pivot members (22). The headgate pivot members (22) are located at the top and bottom of the headgate (13) near the first lateral side (13a). The headgate pivot members (22) are affixed to the headgate (13) at the headgate support structures (23) which extend across the top and bottom portion of the headgate (13) and affix to the gate pivot member (19). The headgate pivot members (22) are metal cylinders which have the neckbar pivot member (17) disposed therethrough as best seen in FIG. 6. The headgate pivot member (22) operably connects the headgate (13) and the shoulder bar (14) to the second animal securement means (15).

The second animal securement means (15) comprises of a neckbar (16) having a first and second end (16a and 16b) and a neckbar pivot member (17). The neckbar pivot member (17) comprises a metal cylinder of a substantial length and width disposed through the headgate pivot member (22) thereby operably affixing the second animal securement means to the headgate (13). The neckbar (16) is a substantially cylindrically shaped unit which affixes to the neckbar pivot member (17) at the first and second end (16a and 16b). The neckbar (16) extends outward from the first end (16a) for a substantial distance then curves downward and extends substantially vertical for a distance then curves inward and affixes to the neckbar pivot member (17) at the second end (16b).

Figure 5:
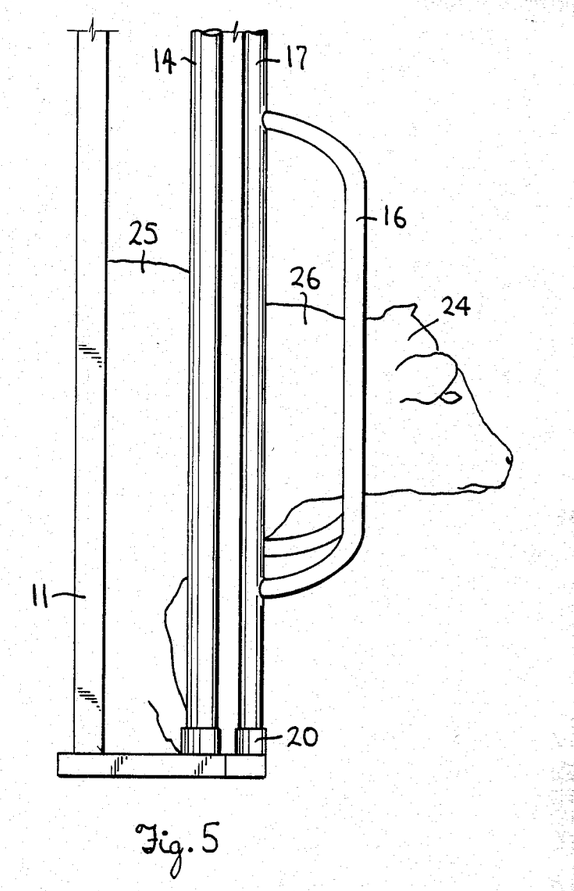
FIG. 5 is a perspective detail view of the animal headgate showing the area of the cow restrained between the first animal securement means and the second animal securement means.

As seen in FIG. 5, the neckbar (16) is positioned substantially forward of the shoulder bar (14), thereby creating an area of maximum restraint including the animal's head area (24) and neck area (26). The neckbar (16) is substantially curved near its middle section (16c), as best seen in FIG. 3 so as to allow the neckbar (15) to enclose around an animal's neck/head region (24 and 26) while the headgates (13) are in the latch position.

Referring now to FIG. 6, the pivot control unit (18) is affixed to the frame (11) and to the neckbar pivot member (17) thereby enabling the second securement animal means (15) to rotate independently from the headgate (13) rotation. The pivot control unit (18) comprises a first angle arm (28) having a proximal end (32) and a distal end (33), a second angle arm (29) having a proximal end (34) and a distal end (35), and a frame mounted pivot base (30).

The pivot control unit (18) is affixed to the neckbar pivot member (17) at the proximal end (32) of the first angle arm (28). The first angle arm (28) is pivotably connected to the second angle arm (29) at the distal end (33) of the first angle arm (28). The second angle arm (29) is affixed to the frame (11) at the frame mounted base (30) at the distal end (35) of the second angle arm (29). The pivotable angle arms allow the second animal securement means (15) to rotate with respect to the frame (11) independently from the rotating movement of the headgate (13) which rotates with respect to the frame (11) at the gate pivot member (19).

Figure 2:
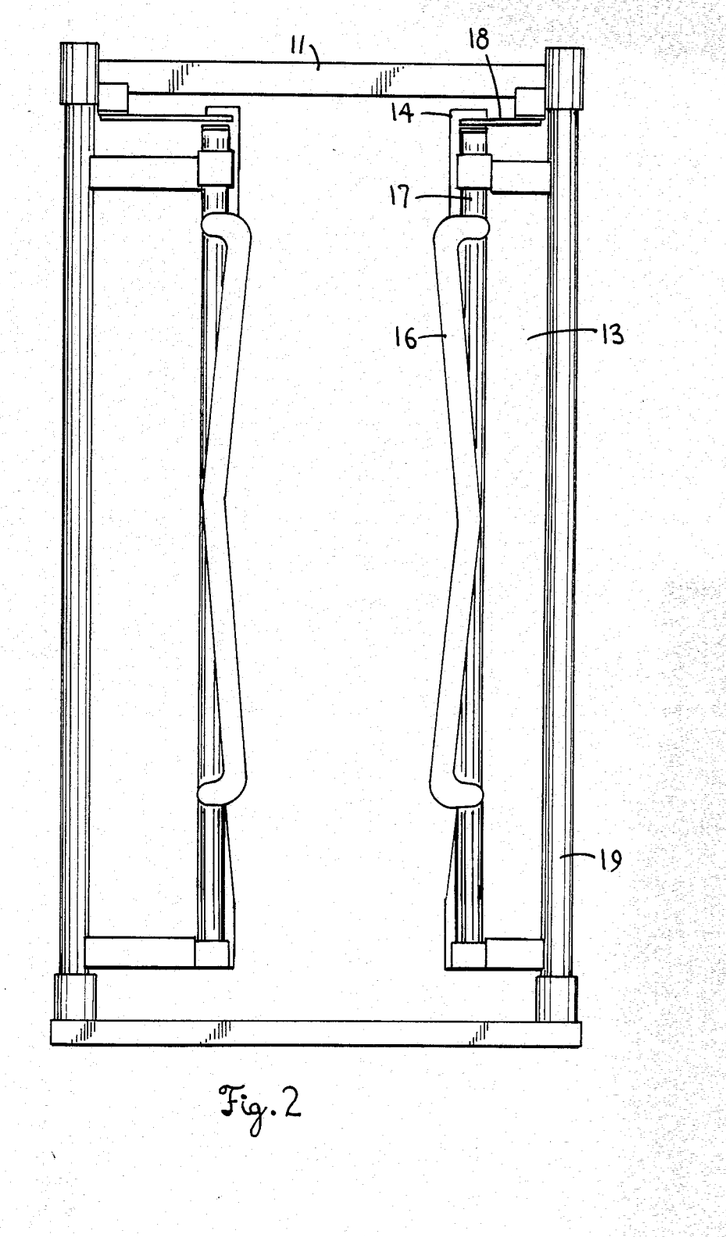
FIG. 2 comprises of a front elevational view of the animal headgate in the receive position.
Figure 7:
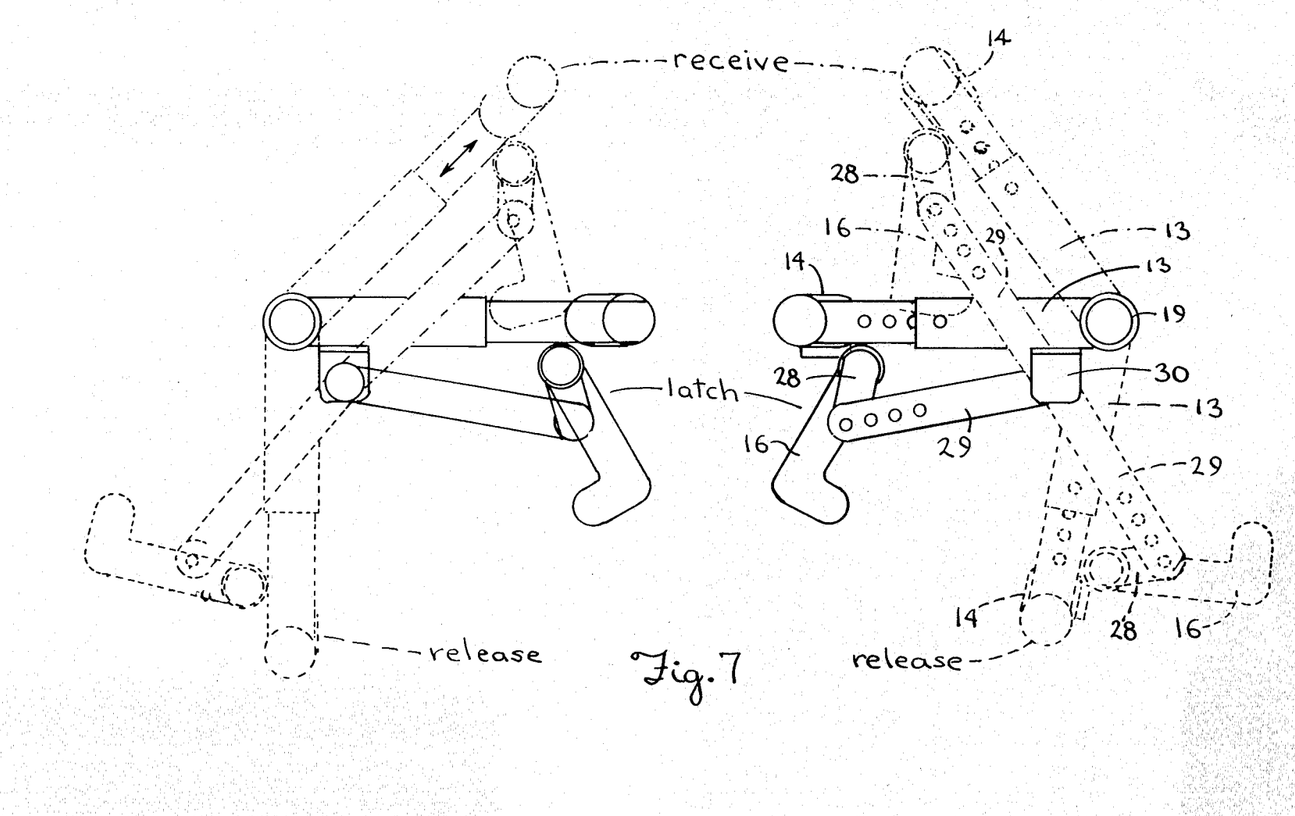
FIG. 7 is a top plan diagrammatic view of the pivot control unit as seen in the receive, latch and release positions.

Referring now to FIG. 2, the apparatus (10) can be seen in a receive position wherein the headgates (13) are positioned to allow an animal to enter the apparatus (10). The pivot control unit (18) operates to pivot the neckbar pivot member (17) and the neckbar (16) into a receive position. FIG. 7 shows a top plan view of the pivot control unit (18) linkage system as it moves among the receive, latch and release positions. In the receive position, the headgates (13) are positioned rearwardly with respect to the frame mounted pivot base (30) which is affixed to the frame (11) and functions as the pivotable reference point. In the receive position, the headgates (13) extend rearwardly with respect to frame (11) toward the back portion of the apparatus (10).

The first and second angle arms (28 and 29) extend rearwardly from the frame mounted pivot base (30) and operably rotate the second animal securement means (15) such that the neckbar (16) is positioned to allow the animal to enter the apparatus (10).

As the headgates (13) are moved from the receive position to the latch position, the headgate (13) pivots about the gate pivot member (19) thereby enclosing the shoulder bar (14) just forward of the animal's shoulders (25) as seen in FIG. 5. The pivot control unit (18) independently rotates from the receive position to the latch position thereby pivoting the neckbar pivot member (17) and the neckbar (16) so as to rotate the neckbar (16) around the neck/head region (24 and 26) of the animal, forward of the shoulder bar (14). The relationship of the shoulder bar (14) and the forward positioned neckbar (16) in the latch position can best be seen in FIG. 5 which shows the area of restraint created by the relative position of the neckbar (16) to the shoulder bar (14).

Figure 4:
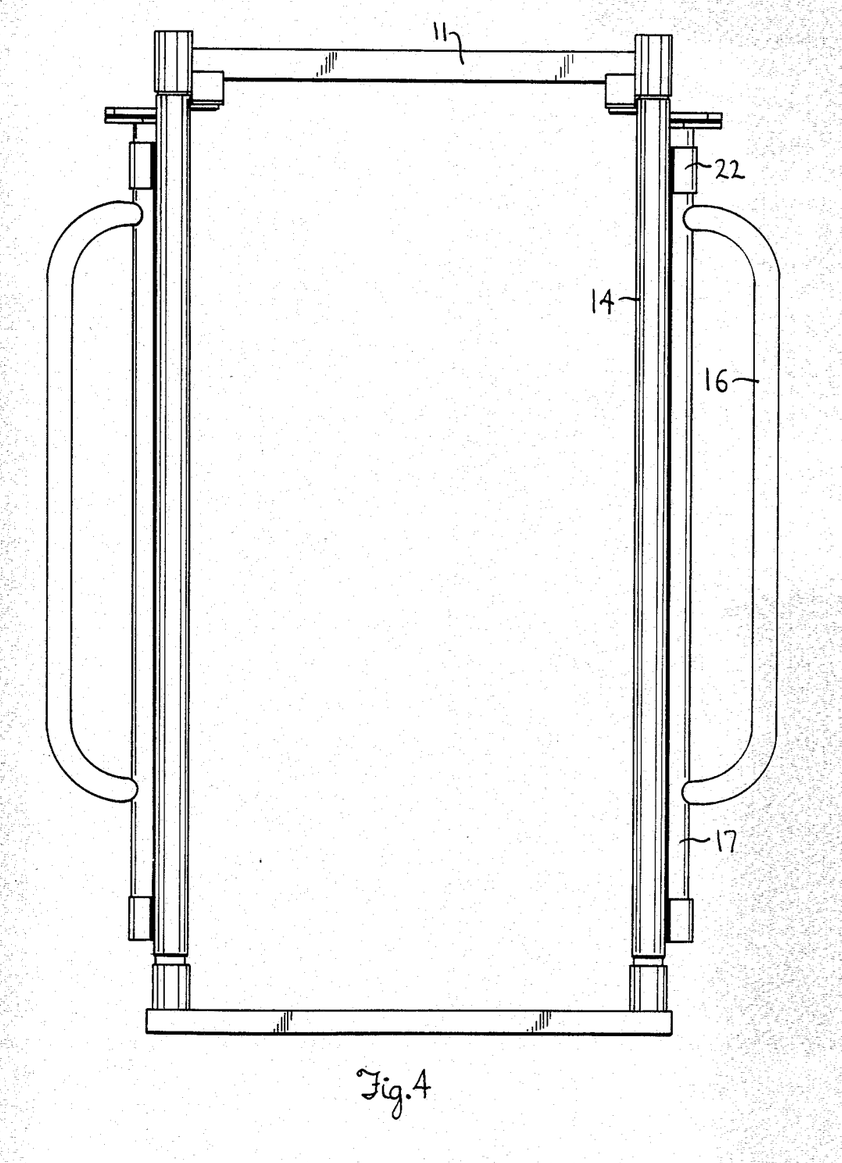
FIG. 4 comprises of a front elevational view of the animal headgate in the release position.

Referring now to FIG. 1, in the latch position, the headgates (13) are locked into place by means of a locking unit (12). Such locking units (12) are well known in the art and hence only a brief description of such a unit will be provided here. The locking unit is operated by a lever (37) attached to a spring loaded locking box (38), such that the spring forces the locking box (38) to lock the headgates (13) into position by maintaining physical resistance against the headgates (13). When it is desired to allow the animal to exit the apparatus (10) the locking unit (12) is disengaged thereby allowing the headgates (13) to swing open into the release position. As seen in FIG. 7, the pivot control unit (18) rotates the neckbar pivot member (17) and the neckbar (16) outwardly to allow the animal to exit the apparatus. The open headgates (13) are best seen in FIG. 4.

Some prior art headgates have one gate that may be laterally adjusted and a remaining gate that cannot be adjusted. With such a gate, animals of varying lateral dimensions can be accommodated. When using such an adjustable gate, the second animal securement means associated with the nonadjustable gate should be attached as described above. The second animal securement means associated with the adjustable gate should be connected, however, to allow the neck bar (16) and other associated structure to be laterally adjustable as well.

As shown in FIG. 7, this can be accomplished by connecting this first neckbar (51) to the nonadjustable gate (52) and the second neckbar (53) to the shoulder bar (14) associated with the adjustable gate (54). So configured, the second neckbar (53) will be laterally extendable with the shoulder bar (14) itself, as desired.

The present apparatus (10) should be comprised of substantially durable material, such as steel, so as to withstand any pressure which may be exerted against it by a large animal. The addition of the second animal securement means (15) enhances the strength and durability of the apparatus (10) without increasing the cost of material dramatically. The addition of the second securement means (15) actually reduces the overall cost of the use of the apparatus (10) in the animal husbandry procedure by enabling the attendant to accomplish the desired task more efficiently in less time.

Obviously, numerous modifications and variations of the present invention are possible in light of the above teachings. It is therefore to be understood that within the scope of the appended claims, the invention may be practised otherwise than as specifically described therein.

I claim:

1. In an animal headgate having a forward portion and a rearward portion on a stationary frame, first and second gate pivot members pivotally connected to said stationary frame, first and second gates attached to said gate pivot members, said gates being movable among receive, latch and release positions, first animal securement means attached to said gates for substantially restraining movement of an animal, and a locking means for selectively locking said gates in the latch position to restrain said animal, an improvement comprising second animal securement means operably affixed to said gates for further restraining movement of said animal wherein said second animal securement means are vertically disposed and positioned forward of said first animal securement means thereby creating a restrained and exposed area on a restrained animal between said first and second animal securement means.

2. The improvement of claim 1 wherein said second animal securement means are movably affixed to said gates.

3. In an animal headgate having a forward portion and a rearward portion on a stationary frame, first and second gate pivot members pivotally connected to said stationary frame, first and second gates attached to said gate pivot members, said gates being movable among receive, latch and release positions, animal securement means attached to said gates for substantially restraining movement of an animal, and a locking means for selectively locking said gates in the latch position to restrain said animal, an improvement comprising second animal securement means operably affixed to said gates for further restraining movement of said animal, wherein said second animal securement means is positioned forward of said first animal securement means thereby creating a restrained and exposed area on a restrained animal between said first and second animal securement means, and wherein said second animal securement means includes, (a) a pair of neckbars, said neckbars each having a first and second end;

(b) a plurality of neckbar pivot members, one of each said neckbar pivot members being affixed to each end of each of said neckbars; and (c) each of said neckbar pivot members is rotatably affixed to one of said gates.

4. The improvement of claim 3 and further including pivot control units operably connected between said second animal securement means and said headgate frame such that said pivot control units operate to control said neckbars to appropriately place said neckbars in a receive position, latch position, and a release position.

5. The improvement of claim 4, wherein said pivot control units operate to position said neckbars in a receive position to allow an animal to enter said headgate when said gates are in the receive position.

6. The improvement of claim 4 wherein said pivot control units operate to position said neckbars in a latch position wherein said neckbars of said second animal securement means are disposed around the neck area of the animal forward of said first animal securement means when said gates are in the latch position.

7. The improvement of claim 4 wherein said pivot control units operate to position said second animal securement means to allow the animal to leave the apparatus when said gates are in the release position.

8. The improvement of claim 4 wherein said pivot control units include a frame mounted pivot base connected to the frame, and a plurality of pivot arm units operably connected to said frame mounted pivot base and to said neckbar pivot member.

* * * * *